United States Patent [19]

Knowlton

[11] Patent Number: 5,036,662

[45] Date of Patent: Aug. 6, 1991

[54] INLINE PARTIAL FLOAT

[76] Inventor: Robert Knowlton, Box 136, Turtleford, Saskatchewan, Canada, S0M 2Y0

[21] Appl. No.: 346,514

[22] Filed: May 2, 1989

[30] Foreign Application Priority Data

May 3, 1988 [CA] Canada .................................. 565752

[51] Int. Cl.[5] .............................................. F16D 31/02

[52] U.S. Cl. ........................................ 60/469; 138/31; 417/540

[58] Field of Search .................. 60/414, 469; 417/540; 138/31

[56] References Cited

U.S. PATENT DOCUMENTS 3,196,605 7/1965 Stevens ............................ 60/469 X

FOREIGN PATENT DOCUMENTS 2758128 6/1979 Fed. Rep. of Germany ........ 60/469

*Primary Examiner*—William E. Wayner

*Attorney, Agent, or Firm*—Murray E. Thrift; Stanley G. Ade; Adrian D. Battison

[57] ABSTRACT

A float attachment for hydraulic systems, such as those used in controlling dozer blades, front end loaders, snow plow blades and the like where the blade, bucket or the like is controlled with a double acting cylinder. The float apparatus includes a float cylinder that is connected in parallel with the double acting cylinder. The float cylinder contains a free floating piston and may have, at the end connected to the lowering end of the hydraulic cylinder, a check valve preventing flow into the float cylinder and a pressure relief valve by-passing the check valve. The relief valve controls the pressure of the blade on the ground and allows the blade to float if that pressure is exceeded.

22 Claims, 2 Drawing Sheets

INLINE PARTIAL FLOAT

FIELD OF THE INVENTION

The present invention relates to hydraulic systems and more particularly to a float mechanism for use in systems employing hydraulic cylinders.

BACKGROUND

The present invention has particular applicability to the operating systems for bulldozer blades, front end loaders, snow plows and other units that are raised and lowered by hydraulic cylinders. In such systems, the hydraulic cylinders are effectively rigid components of the system and prevent any movement of the blade, loader or the like other than under the control of the hydraulic system. This can be undesirable where the operating part of the system, the blade, bucket or the like, can come into contact with a solid object. With no "give" in the system, damage can result.

The aim of the present invention is to provide an apparatus that can be used with a system of this sort to allow the blade, header or bucket to float to some degree in response to an impact with a solid object.

SUMMARY

According to one aspect of the present invention there is provided a float attachment for use with hydraulic cylinders comprising:

a float cylinder;

first and second fluid ports communicating with opposite ends of the cylinder; and a floating piston in the cylinder, between the first and second ports.

In applications such as graders, where the blade should float only when a pre-determined overload is applied to it, the apparatus may include a check valve connected to the first port, to allow the free flow of fluid out of the cylinder, and a relief valve by-passing the check valve to permit the flow of fluid into the cylinder at a fluid pressure above a pre-determined relief pressure.

The apparatus may be connected in parallel with a double acting hydraulic cylinder so that the cylinder can extend and contract with changes in the force on the piston rod. With the check valve and relief valve connected, excessive pressure applied to the check valve end of the apparatus will be partially relieved.

The present invention also provides hydraulic systems incorporating the float apparatus.

BRIEF DESCRIPTION OF THE DRAWINGS

In the accompanying drawings which illustrate exemplary embodiments of the present invention.

DETAILED DESCRIPTION

Figure 1:
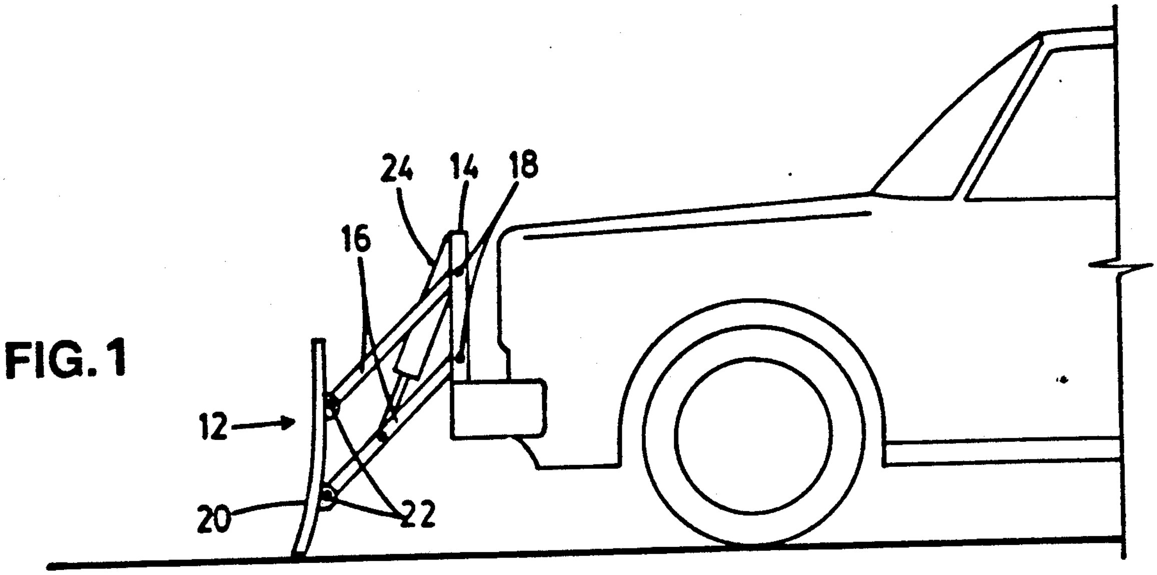
FIG. 1 is a side elevation of a vehicle equipped with an hydraulically operated blade.

Referring to the accompanying drawings, and especially to FIG. 1, there is illustrated a truck 10 equipped with a plow unit 12 of conventional form. The plow unit includes a frame 14 mounted on the truck chassis. Arms 16 are connected to the frame 14 by pivot pins 18 so that they may pivot about horizontal axes extending across the truck. A blade 20 is connected to the other ends of the arms 16 by pivot pins 22. This constitutes a four bar linkage, allowing the blade to move up and down with respect to the frame 14. To control this movement, there is a double acting hydraulic cylinder 24 connected between the frame 14 and the blade 22. Contraction of the cylinder will raise the blade, while extension of the cylinder will lower the blade. The pressure applied to the blade in the lowered condition will control the force with which it engages the ground.

Figure 2:
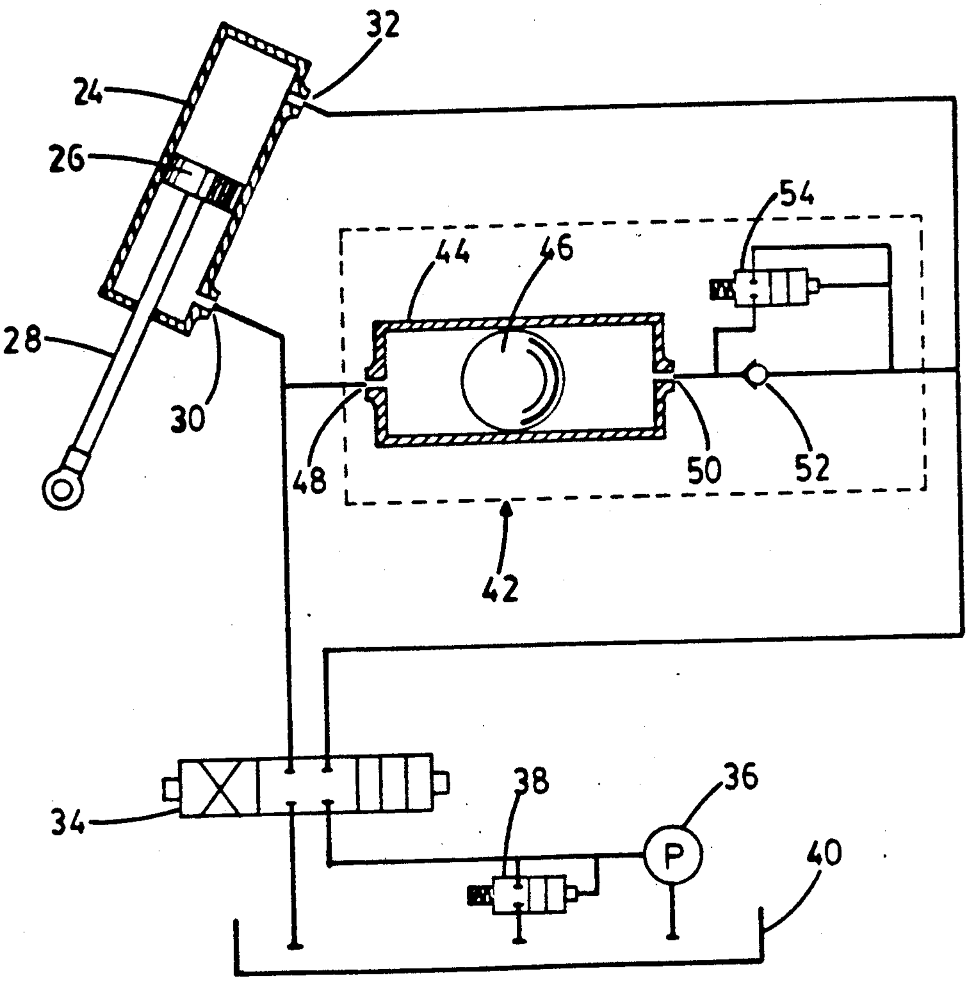
FIG. 2 is an hydraulic schematic for a blade such as that illustrated in FIG. 1, incorporating a float according to the present invention.

FIG. 2 is a schematic illustration of an hydraulic circuit for the blade of FIG. 1. The cylinder 24 carries a piston 26 and a piston rod 28. At opposite ends of the cylinder are a lift port 30 and a lower port 32. The injection of hydraulic fluid into the lift port will cause contraction of the cylinder, and lifting of the blade, while the injection of hydraulic fluid into the lower port 32 will extend the cylinder and lower the blade.

Both ports of the cylinder 24 are connected to a three way shuttle valve 34. The valve is supplied with pressurized hydraulic fluid by a pump 36 supplied by a reservoir 40. A variable relief valve 38 by-passing the pump controls the pressure supplied to the shuttle valve.

The float mechanism 42 is connected across the lift and lower ports 30 and 32 of the hydraulic cylinder 24. This mechanism consists of a float cylinder 44 carrying a freely floating piston 46 in the form of a spherical ball. The lift cylinder 44 has a lift port 48 located centrally in one end of the cylinder and a lower port 50 located centrally in the opposite end of the cylinder. The lift port is connected to the hydraulic line joining the lift port of hydraulic cylinder 24 and shuttle valve 34. The lower port 50 of the lift cylinder 44 is connected to a check valve 52 that allows free flow of hydraulic fluid out of the lower port, while preventing flow into the cylinder through that port. The check valve has its outlet connected to the hydraulic line joining the lower port 32 of hydraulic cylinder 24 to the shuttle valve 34. The check valve is by-passed by a variable relief valve 54.

In operation, the blade may be raised when the shuttle valve 34 is actuated to apply pressurized hydraulic fluid from the pump 36 to the lift port 30 of the hydraulic cylinder 24 and the lift port 48 of the float cylinder 44. In the float cylinder, the piston 46 is driven along the cylinder 44, discharging the fluid on the other side through the check valve 52 and the shuttle valve 34 to the reservoir 40. When the piston bottoms out at the end of the cylinder, it engages a valve seat around the port 48 to close that port. Further hydraulic fluid is then pumped into the lift port 30 of the hydraulic cylinder 24, causing the cylinder to contract.

To lower the blade 20 the shuttle valve is actuated to apply pressurized fluid from the pump 36 to the lower port 32 of the hydraulic cylinder. This extends the cylinder 24, with the hydraulic fluid discharged from the lift port 30 being passed through the shuttle valve to the reservoir 40. When the blade engaged the ground, the pressure applied to the cylinder only increases until it reaches the relief pressure of the relief valve 54. The piston 46 will be lifted off of the seat around port 50 and driven along the cylinder 44. If the hydraulic flow through the system is then stopped, the blade will "float" as it is driven along the ground. If it encounters a solid object, the tendency of the blade to lift and compress the cylinder 24 will produce a pressure at the lower port 32 of the cylinder greater than the release pressure of the relief valve 54. The relief valve will therefore open allowing hydraulic fluid to flow from the cylinder 24 through lower port 32 and into the float cylinder 44. There will be a free flow of fluid between the cylinder 24 and 44 through lift ports 30 and 48. The cylinder will therefore contract. The blade will remain in contact with the ground by virtue of load on the lower side of cylinder 24, which will not be less than the release pressure of valve 54.

To exert full pressure on the blade, the flow into the lower sides of cylinder 24 and 44 is maintained until piston 46 bottoms out at the lift port end of cylinder 44.

Figure 3:
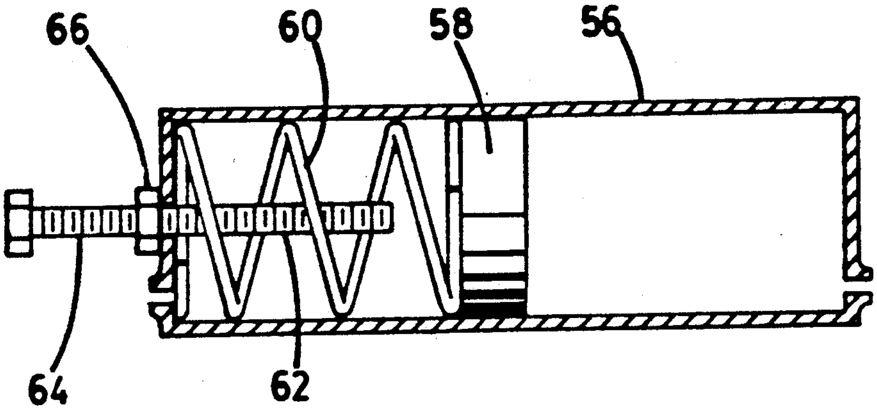
FIG. 3 is a longitudinal section of an alternative embodiment of the float apparatus.

FIG. 3 illustrates an alternative embodiment of the float apparatus. In this embodiment, the float cylinder 56 houses a disk-like piston 58 that is biased away from the end of the cylinder containing the lower port by a coil spring 60. A piston stop 62 extends into the cylinder to limit the movement of the piston towards the lower port. The piston stop in this embodiment is adjustable and consists of a bolt 64 threaded through the end of the cylinder 44 and locked in place with a lock nut 66. The spring provides an increased pressure on the lift end of the cylinder 44 to provide a lift assist for heavy blades. This embodiment of the invention can also be connected to single acting cylinders to provide a lift assist on combine and swather headers and rotary mowers.

Figure 4:
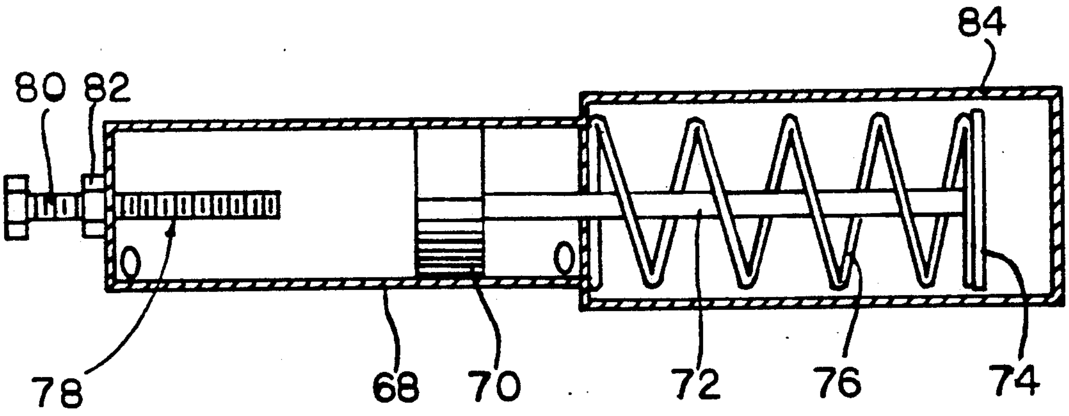
FIG. 4 is a view like FIG. 3 of a further embodiment of the invention.

In FIG. 4, the float cylinder 68 houses a piston 70, fixed to a piston rod 72. The rod 72 extends through the end of cylinder 68 and carries a spring seat 74 on its outer end. A coil spring 76 extends between the seat 74 and the end of the cylinder. The other end of the cylinder carries a piston stop 78 consisting of a bolt 80 and a lock nut 82. The spring is housed in a casing 84 for safety reasons. This embodiment operates in the same way as the embodiment of FIG. 3.

While particular embodiments of the present invention have been described in the foregoing, it is to be understood that alternative embodiments are possible within the scope of the present invention. The invention is to be considered limited solely by the scope of the appended claims.

I claim:

1. A float attachment for use with hydraulic cylinders comprising:
- a float cylinder;
- first and second fluid ports communicating with opposite ends of the cylinder;
- a floating piston in the cylinder, between the first and second ports; and
- a check valve connected to the first port, to allow the free flow of fluid out of the cylinder, and a relief valve by-passing the check valve to permit the flow of fluid into the cylinder at a fluid pressure above a predetermined pressure.

2. An apparatus according to claim 1 wherein the relief valve is adjustable.

3. An apparatus according to claim 1 wherein the piston is a ball.

4. An apparatus according to claim 1 wherein the first port is located centrally in a first end of the cylinder and includes a valve seat engagable by the piston to close the first port.

5. An apparatus according to claim 1 wherein the first and second ports are centrally located in respective ends of the cylinder and the first port includes a valve seat engagable by the piston to close the first port.

6. An apparatus according to claim 1 including a piston stop limiting travel of the piston towards the first port and a spring biasing the piston towards the second port.

7. An apparatus according to claim 5 wherein the stop is adjustable.

8. An apparatus according to claim 6 wherein the stop comprises an elongate element extending axially along the cylinder from a first end thereof.

9. An apparatus according to claim 1 including a piston stop limiting travel of the piston towards the first port and a spring biasing the piston towards the second port.

10. An apparatus according to claim 9 wherein the stop is adjustable.

11. An apparatus according to claim 10 wherein the stop comprises an elongate element extending axially along the cylinder from an end thereof.

12. An hydraulic system including a double acting cylinder, means for applying pressurized hydraulic fluid to either end of the cylinder and simultaneously allowing the discharge of hydraulic fluid from the other end, a float apparatus connected in parallel across the double acting cylinder, said float apparatus comprising:
- a float cylinder;
- first and second float ports communicating with respective first and second ends of the float cylinder, the first and second ports being hydraulically connected to opposite ends of the double acting cylinder;
- a floating piston in the float cylinder;
- a check valve connected to the first port to allow the free flow of fluid out of the float cylinder;
- a relief valve by-passing the check valve to allow the flow of fluid into the cylinder at a fluid pressure above a predetermined pressure; and
- means connecting the check valve to the other end of the double acting hydraulic cylinder.

13. An apparatus according to claim 12 wherein the piston is a ball.

14. An apparatus according to claim 12 wherein the first port is located centrally in the first end of the float cylinder and includes a valve seat engagable with the piston to close the first port.

15. An apparatus according to claim 12 wherein the first port is located centrally in the first end of the float cylinder and includes a valve seat engagable with the piston to close the first port.

16. A system according to claim 12 wherein the first and second ports are centrally located in respective ends of the float cylinder and the first port includes a valve seat engagable with the piston to close the first port.

17. A system according to claim 12 wherein the first and second ports are centrally located in respective ends of the float cylinder and the first port includes a valve seat engageable with the piston to close the first port.

18. An apparatus according to claim 12 wherein the relief valve is adjustable.

19. A float attachment for use with an hydraulic cylinder comprising:
- a float cylinder;
- a floating piston in the cylinder;
- a piston rod extending through a first end of the float cylinder;

fluid port means including at least a first fluid port communicating with the first end of the float cylinder; and resilient means biasing the piston towards the first end of the float cylinder and comprising a spring seat on a free end of the piston rod and a compression spring acting between the first end of the cylinder and the spring seat.

20. An apparatus according to claim 19 including a casing enclosing the spring, spring seat and piston rod.

21. An hydraulic system including an hydraulic cylinder, means for selectively applying pressurized hydraulic fluid to at least a first end of the hydraulic cylinder and a float apparatus connected to the hydraulic cylinder, said float apparatus comprising:

a float cylinder;

a first port communicating with a first end of the float cylinder, the first port being connected to the first end of the hydraulic cylinder;

a floating piston in the float cylinder;

a piston rod extending through the first end of the float cylinder; and resilient means biasing the piston towards the first end of the float cylinder and comprising a spring seat on a free end of the piston rod and a compression spring acting between the first end of the float cylinder and the spring seat.

22. An apparatus according to claim 21 including a casing enclosing the spring, spring seat and piston rod.

* * * * *